(12) United States Patent
Van Luchene et al.

(10) Patent No.: US 7,783,537 B1
(45) Date of Patent: Aug. 24, 2010

(54) METHOD AND APPARATUS FOR CONDITIONAL PAYMENT TO A SELLER

(75) Inventors: Andrew S. Van Luchene, Norwalk, CT (US); Adam Stevenson, Solara Beach, CA (US); Magdalena Mik, Greenwich, CT (US); Russell Pratt Sammon, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/536,791

(22) Filed: Mar. 28, 2000

Related U.S. Application Data

(60) Provisional application No. 60/168,370, filed on Dec. 1, 1999.

(51) Int. Cl.
*G06Q 40/00* (2006.01)

(52) U.S. Cl. .................................. 705/35; 705/39

(58) Field of Classification Search ............... 705/14, 705/26, 35, 38, 39, 36 R, 37
See application file for complete search history.

(56) References Cited

U.S. PATENT DOCUMENTS

| | | | |
|---|---|---|---|
| 4,700,055 A | 10/1987 | Kashkashian, Jr. | |
| 4,718,009 A | 1/1988 | Cuervo | |
| 5,025,138 A | 6/1991 | Cuervo | |
| 5,025,372 A * | 6/1991 | Burton et al. | 705/14 |
| 5,477,040 A | 12/1995 | Lalonde | |
| 5,583,760 A | 12/1996 | Klesse | |
| 5,689,100 A | 11/1997 | Carrithers et al. | |
| 5,724,523 A | 3/1998 | Longfield | |
| 5,870,721 A | 2/1999 | Norris | |
| 5,878,139 A * | 3/1999 | Rosen | |
| 5,878,141 A | 3/1999 | Daly et al. | |
| 5,878,403 A | 3/1999 | DeFrancesco et al. | |
| 5,893,080 A | 4/1999 | McGurl et al. | |
| 5,923,016 A | 7/1999 | Fredregill et al. | |
| 5,934,439 A | 8/1999 | Kanoh et al. | |
| 5,945,653 A | 8/1999 | Walker et al. | |
| 5,949,044 A | 9/1999 | Walker et al. | |
| 5,950,179 A | 9/1999 | Buchanan et al. | |

(Continued)

OTHER PUBLICATIONS

Service helps users to sell on the Web; [ALL Edition] James Turner. The Christian Science Monitor. Boston, Mass.: Nov. 22, 1999. p. 16.*

(Continued)

*Primary Examiner*—Lalita M Hamilton
(74) *Attorney, Agent, or Firm*—Fincham Downs LLC

(57) ABSTRACT

A system and method for conducting conditional payments includes receiving an application for a financial account and an authorization to credit an amount to the financial account. Information identifying a substitute collection technique is also received. The transaction is then finalized after receipt of both the application for the financial account and the authorization. The transaction can be finalized in several different ways, depending upon whether the application is approved or rejected. For example, if the application is approved, the transaction can be finalized by crediting the financial account by a first amount, which may represent, for example, the price of an item sold by a seller plus an incentive amount. If, however, the application is rejected, the transaction can be finalized by changing a second amount, without the incentive, to collection technique.

15 Claims, 7 Drawing Sheets

U.S. PATENT DOCUMENTS

| | | | |
|---|---|---|---|
| 6,105,863 A * | 8/2000 | Jagadish et al. ............. 235/379 |
| 6,141,006 A | 10/2000 | Knowlton |
| 6,226,624 B1 | 5/2001 | Watson et al. |
| 6,269,361 B1 | 7/2001 | Davis et al. |
| 7,010,512 B1 * | 3/2006 | Gillin et al. ................... 705/39 |
| 7,386,508 B1 * | 6/2008 | Walker et al. ................. 705/39 |
| 2003/0028481 A1 | 2/2003 | Flitcroft et al. |

OTHER PUBLICATIONS

Excite StoreBuilder Gives Small Businesses the Tools to Become E-Merchants Within Hours; [1] PR Newswire. New York: Nov. 11, 1999. p. 1.*

Humberto Cruz, "Checks Are In The Mail; But Beware; Ctredit Company's Letter Promises Money, But Neglects to Mention High Interest Rate", Chicago Tribune, Nov. 25, 1993, North Sports Final Edition, Your Monety Section at p. 11.

Tim Deady, "Cheetah Races for Software Sales; Bobby Darroll's Company Creates Systems To Help The Retail World Better, Cheetah Software Systems", Los Angeles Business Journal, Sep. 19, 1994, vol. 16, No. 37, at p. 1.

U.S. Appl. No. 09/098,481, filed Jun. 16, 1998, Mik et al.

Dana Phillips, "He Won't Give Up on Credit Card Plan", South Florida Business Journal, Dec. 16, 1994, vol. 15, No. 17, Section A at p. 3.

"Beneficial National Bank USA and BJ's Wholesale Club Launch First Co-Branded Credit Card", Business Wire, Aug. 15, 1995.

U.S. Appl. No. 09/274,281, filed Mar. 22, 1999, Walker et al.

"Sears Roebuck Is Testing a Charge Card Based on the Automated Clearing House With Low-Income and Poor C Redit-History Customers", Card Fax, Jan. 8, 1996, vol. 96, No. 6 at p. 1.

Patricai A. Murphy, Boscov's Converts Checkwriters to Cardholders, National Retail Merchants Association Stores, Jun. 1996, vol. 78, No. 6 at p. 62-63.

Gregory J. Gilligan, "Credit Cards From Retail Stores a Mixed Blessing for Shoppers", The Richmond Times Dispatch, Jul. 20, 1997, City Edition, Business Section at p. E-1.

Laura Spinale, Financers Jockey for Retail, Dealerscope Consumer Electronics Marketplace, Aug. 1997, vol. 39, No. 8 at p. 22-23+.

"Kmart Puts Credit Card Applications Online; Brief Article", Daily News Record, Aug. 27, 1997, Section No. 103, vol. 27 at p. 10.

"Best Buy and Beneficial National Bank USA Launch Interactive Credit Application", Business Wire, Oct. 7, 1997.

"Default Proof Credit Card System Inc. Announces Favorable Office Action for Debit Card ATM Dispenser", Business Wire, Jun. 24, 1998.

"Default Proof Credit Card Systems Inc. Announces Timely Completion of Its Web Site Domain Name Ubuydebitcards.com—Patent Pending", Business Wire, Mar. 23, 1999.

"Default Proof Credit Card System Inc. Names New President and CFO", Business Wire, Jun. 28, 1999.

"Default Proof Credit Company Profile", (http://members.aol.com/dpccsystem/), download date: Oct. 7, 1999.

"Curtrem.com-Need a Credit Card or Lower Rates?", (http://www.curtrem.com/unsec3a.htm), download date: Oct. 14, 1999.

Office Action for U.S. Appl. No. 09/536,788, mailed Mar. 28, 2000, 9 pp.

Office Action for U.S. Appl. No. 09/536,788, mailed Oct. 8, 2003, 6 pp.

* cited by examiner

| APPLICATION IDENTIFIER 302 | SELLER IDENTIFIER 304 | SUBSTITUTE FORM OF COLLECTION 306 | INCENTIVE AMOUNT 308 | STATUS 310 | INCENTIVE STATUS 312 | NEW ACCOUNT IDENTIFIER 314 |
|---|---|---|---|---|---|---|
| AP-58352-242 | S-253-893-236 | CREDIT CARD 3476-2345-9865 | $10.00 | APPROVED ($2000 LIMIT) | PAID | NEW CREDIT CARD 0723-9035-7522-9578 |
| AP-13902-094 | S-024-237-683 | MAIL CHECK TO SPECIFIED ADDRESS | $10.00 | APPROVED ($500 LIMIT) | PAID | NEW CREDIT CARD 0723-8562-0947-0042 |
| AP-02459-902 | S-033-020-240 | DEBIT CARD 3204-0240-0294-9525 | $15.00 | APPROVED ($500 LIMIT) | PAID | NEW CREDIT CARD 0723-1393-3024-2045 |
| AP-85375-472 | S-302-024-024 | DEBIT CARD 6735-8957-4624-9574 | $20.00 | REJECTED | NOT PAID | N/A |
| AP-92475-394 | S-028-294-244 | MAIL CHECK TO SPECIFIED ADDRESS | 10% OF SALE | REJECTED | NOT PAID | N/A |
| AP-47235-037 | (415) 555-1234 | BANK ACCOUNT 003929392-78342-83293-0323 | 15% OF SALE | REJECTED | NOT PAID | N/A |
| AP-03924-342 | (917) 555-1584 | BANK ACCOUNT 049404930-04040-49049-4043 | $10.00 | APPROVED ($1000 LIMIT) | NOT PAID | NEW CREDIT CARD 0723-0249-0245-0242 |
| AP-10023-093 | S-092-092-092 | CREDIT CARD 1234-4403-9356-3533 | $10.00 | PENDING | NOT PAID | --- |
| AP-12304-231 | S-923-242-892 | CHECKING ACCOUNT 8902-8901-2341-4112 | $20.00 | PENDING | NOT PAID | --- |

| SELLER IDENTIFIER 402 | NAME 404 | MAILING ADDRESS 406 | PHONE NUMBER 408 |
|---|---|---|---|
| S-253-893-236 | JEFF RIGGS | ADDRESS | (203) 555-1231 |
| S-024-237-683 | BOB MURDOCK | ADDRESS | (245) 555-2456 |
| S-033-020-240 | KELLY LEE | ADDRESS | (204) 555-0942 |
| S-302-024-024 | JILL BLACKMAN | ADDRESS | (903) 555-2424 |
| S-028-294-244 | PAUL PORTER | ADDRESS | (803) 555-8353 |
| (415) 555-1234 | BRUCE NORRIS | ADDRESS | (415) 555-1234 |
| (917) 555-1584 | JOHN SEAGAL | ADDRESS | (917) 555-1584 |
| S-092-092-092 | ROB RAKE | ADDRESS | (505) 555-2042 |
| S-923-242-892 | JACK BEAM | ADDRESS | (902) 555-5736 |

FIG. 4

| TRANSACTION IDENTIFIER 502 | SELLER IDENTIFIER 504 | SALE PRICE 505 | TOTAL PAYMENT 506 | TIME 508 | PAYMENT IDENTIFIER 510 |
|---|---|---|---|---|---|
| T-24-13455 | S-253-893-236 | $155.05 | $165.05 | 9/14/99 10:34AM | NEW CREDIT CARD 0723-9035-7522-9578 |
| T-04-24054 | S-024-237-683 | $780.98 | $790.98 | 9/14/99 10:40AM | NEW CREDIT CARD 0723-8562-0947-0042 |
| T-02-02345 | S-033-020-240 | $217.04 | $232.04 | 9/14/99 10:53AM | NEW CREDIT CARD 0723-1393-3024-2045 |
| T-94-02451 | S-302-024-024 | $470.95 | $470.95 | 9/14/99 10:57AM | DEBIT CARD 6735-8957-4624-9574 |
| T-23-92345 | S-028-294-244 | $1562.05 | $1562.05 | 9/14/99 11:37AM | MAIL CHECK TO SPECIFIED ADDRESS |
| T-95-39245 | (415) 555-1234 | $264.33 | $264.33 | 9/14/99 12:01PM | BANK ACCOUNT #003929392-78342-83293-0323 |
| T-28-09248 | (917) 555-1584 | $978.28 | $988.28 | 9/14/99 1:05 PM | NEW CREDIT CARD 0723-0249-0245-0242 |
| T-33-02840 | NONE | $0 | $10.00 | 9/14/99 2:30 PM | CASH |
| T-39-02495 | NONE | $224.24 | $234.24 | 9/14/99 2:35 PM | DEBIT CARD 2494-0242-0245-4224 |

METHOD AND APPARATUS FOR CONDITIONAL PAYMENT TO A SELLER

CROSS-REFERENCE TO RELATED APPLICATIONS

This application hereby claims priority from U.S. Provisional Application No. 60/168,370 filed Dec. 1, 1999, titled "CONDITIONAL PAYMENT SYSTEMS", the entirety of which is incorporated by reference herein for all purposes.

This application is related to U.S. patent application Ser. No. 09/536,788, filed herewith on Mar. 28, 2000; titled "METHOD AND APPARATUS FOR CONDITIONAL TRANSACTIONS", U.S. Pat. No. 5,949,044 granted Sep. 7, 1999, titled "METHOD AND APPARATUS FOR FUNDS AND CREDIT LINE TRANSFERS"; U.S. Pat. No. 5,945,653 granted Aug. 31, 1999; titled "SYSTEM AND METHOD FOR ESTABLISHING AND EXECUTING FUNCTIONS TO AFFECT CREDIT CARD ACCOUNTS AND TRANSACTIONS"; U.S. patent application Ser. No. 09/098,481 titled "METHOD AND APPARATUS FOR PROCESSING A CHARGE APPLIED TO A FINANCIAL ACCOUNT" filed Jun. 16, 1998 and issued as U.S. Pat. No. 7,536,349 on May 19, 2009 and U.S. patent application Ser. No. 09/274,281 filed Mar. 22, 1999, titled "METHOD AND APPARATUS FOR PROVIDING CROSS-BENEFITS VIA A CENTRAL AUTHORITY". The entire contents of which are incorporated by reference herein for all purposes.

FIELD OF THE INVENTION

The present invention relates to transaction methods and apparatus. More particularly, the present invention relates to methods and apparatus for conducting conditional transactions.

BACKGROUND OF THE INVENTION

Many businesses function as intermediaries in transactions between individual buyers and sellers. Consignment shops are a well-established example of a type of business which allows individuals to sell items by displaying the item at the consignment shop. The consignment shop facilitates transactions between sellers and buyers and typically takes a fee from the seller and/or the buyer. A number of other traditional businesses operate in this manner, such as pawnshops, auction houses, and used car dealers. The widespread acceptance and use of the Internet has led to a new type of business, referred to here as a "market facilitation system," which operates by facilitating commerce between individuals. An example of a market facilitation system is EBAY®, an Internet auction house. These market facilitation systems profit by charging sellers and/or buyers a fee for each item sold. Other types of market facilitation systems purchase information or services from individual sellers. For example, individuals may act as consultants or experts and receive payment from a central service for consulting services rendered to end users. For simplicity, each of these various types of businesses and merchants that function as transaction intermediaries or buyers of goods or services from individuals will generically be referred to here as "intermediaries." Further, individuals or entities that sell goods or services to these intermediaries will be referred to as "sellers." Typically, these sellers will be individuals who are non-commercial sellers of good or services.

The revenue, and therefore success, of each of these intermediaries primarily depends on their ability to collect a fee or commission on each transaction. Competition and market conditions limit the ability of these intermediaries to increase the size of the fee or commissions charged. It would be desirable for these intermediaries to develop an additional revenue source from transactions. It would be further desirable to develop a revenue source which does not alienate customers by raising fees or costs charged to the customer for a transaction.

Another problem encountered by intermediaries involves the difficulty of efficiently paying the seller. For example, an intermediary may receive an item from a seller and then sell it to a buyer days or weeks later. Once payment from the buyer is received, the intermediary must pay the seller. Typically, this is done by paying the seller in cash or by using a check. This can be time-consuming and inefficient for both the intermediary and the seller. It would be desirable to provide an improved method for paying a seller which still allows the intermediary to encourage a seller to open a new financial account. Further, it would be desirable to provide an efficient and prompt payment mechanism for these types of transactions. It would be advantageous to provide a method and apparatus that overcame the drawbacks of the prior art.

SUMMARY OF THE INVENTION

To alleviate the problems inherent in the prior art, and to promote commerce, embodiments of the present invention provide a system and method for conducting conditional payments from intermediaries to sellers.

In one embodiment, a method for conducting conditional payments to sellers includes receiving an application for a financial account and an authorization to credit an amount to the financial account. Information identifying an alternate collection technique is also received. The transaction is then finalized using at least one of the financial account and the alternate collection technique.

The transaction can be finalized in several different ways, depending upon whether the application is approved or rejected. For example, if the application is approved, the transaction can be finalized by crediting the financial account with the first transaction amount, which may represent, for example, the price of an item sold by a seller plus an incentive amount. If, however, the application is rejected, the transaction can be finalized using the alternate collection technique. The alternate collection technique may involve, for example, crediting a second transaction amount to an established credit card. In one embodiment, if the alternate collection technique is used, the second transaction amount includes the price of an item sold by the seller, but does not include a transaction amount.

In one embodiment of the present invention, the "seller" is a party returning a product to a retailer (the "intermediary"). In another embodiment of the present invention, means for conducting conditional payments are provided which includes means for receiving a financial account application and an authorization to credit an amount to the financial account. Means for finalizing the transaction are also provided.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIG. 3 is a table illustrating an exemplary data structure of an application database for use in the present invention;

FIG. 4 is a table illustrating an exemplary data structure of a seller database for use in the present invention;

DETAILED DESCRIPTION OF THE INVENTION

Figure 1:
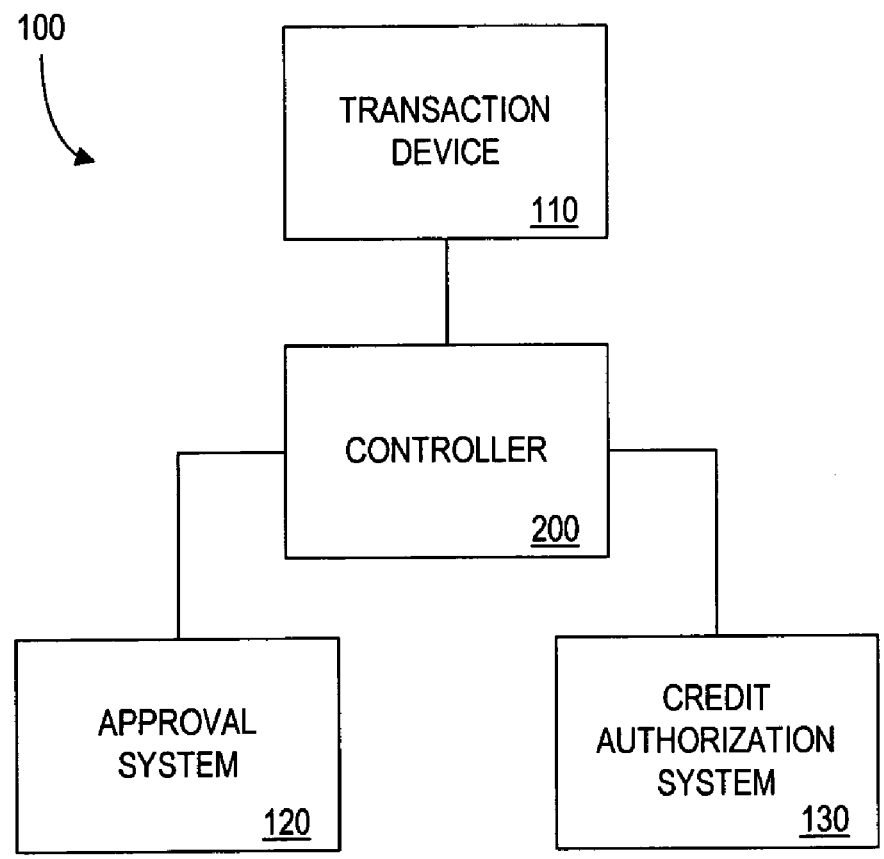
FIG. 1 is a block diagram of a system consistent with the present invention.

Applicants have recognized that merchants, who act as intermediaries or who purchase goods from individual sellers for resale, need a way to increase revenues. These existing merchants are unable to benefit from revenue generation techniques which may be available to other types of merchants. For example, many merchants are able to increase revenues by generating new customer accounts for financial institutions. For example, a merchant may receive a $50.00 bounty from a credit card issuing bank for every new account that is established based on a referral or application received from the merchant. Currently, these techniques are only used by merchants to provide incentives to customers who are buying goods from the merchant. No account generation techniques are known which allow intermediaries to generate increased revenues from sellers of goods or services. Further, applicants have recognized that intermediaries will benefit from an ability to allow sellers or customers to receive payment from the intermediary via a newly-established account.

Accordingly, applicants have developed a system and method where intermediaries can increase revenue through the generation of new financial accounts by offering sellers the option to receive payment from the intermediary via a credit applied to a new financial account or by a credit to an alternative form of collection such as an existing credit card account held by the seller. Using this system, the intermediary enjoys increased revenue by receiving payment for the new financial account from the issuing financial institution. The seller may benefit by receiving an increased payment amount which includes an incentive amount provided by the intermediary. The financial institution benefits from the establishment of a new account relationship and the generation of new transaction, interest, and account fees.

For the purpose of illustrating features of embodiments of the present invention, a brief example transaction will now be discussed. In the example transaction, the intermediary is an Internet classified advertising site which operates by encouraging sellers to list items for sale on the site and by finding buyers for the items. The Internet site may generate revenue by charging sellers a fee for listing the item. In this example, the Internet site charges sellers a flat fee of $5.00 for each listing. In previous systems, the only way for the Internet site to increase revenues was to increase the listing fee. Using features of the present invention, the Internet site may generate additional revenues by establishing a relationship with a financial institution where the Internet site receives a referral fee, or bounty, from the financial institution for each successful new account applicant referred to the financial institution by the Internet site. In this example, the Internet site receives a bounty of $50.00 for each successful referral. The Internet site can pass on some of this bounty to prospective customers (sellers) by offering them an incentive for both listing their item for sale with the Internet site and applying for a new financial account. In this example, the Internet site offers sellers a $10.00 incentive and retains $40.00 of the bounty as revenue.

An individual who wishes to sell his valuable baseball card may be attracted to the Internet site instead of competing sites because of the incentive. The individual lists the card with the Internet site for a sale price of $100.00. According to embodiments of the invention, the Internet site will require the individual to provide an application for the new financial account and a substitute form of collection. In this example, the individual fills out an application for a new credit card account and provides information identifying an existing credit card account as his substitute form of collection. The individual also authorizes the Internet site to pay the individual by crediting a payment amount to the new credit card account or to the existing credit card account, depending upon whether the new account application is approved or rejected.

The Internet site may then forward the application to a financial institution, or other entity, for approval. The Internet site is informed whether the application is approved or rejected. If the application is approved, the sale transaction can be finalized using the new credit card as the vehicle for collection of payment. For example, if the Internet site sells the baseball card to a buyer and the Internet site collects $100.00 for the card, the transaction will be finalized by paying the individual $105.00 ($100.00 from the sale of the card plus the $10.00 incentive minus the $5.00 listing fee). According to an embodiment of the present invention, this amount is paid to the individual by crediting the amount to the new financial account.

If the Internet site is informed that the application for the new credit card was rejected, the sale transaction is finalized using the substitute form of collection. If the Internet site has sold the baseball card to a buyer and has collected $100.00 for the card, the Internet site finalizes the transaction with the seller by paying the seller $95.00 ($100.00 from the sale of the card minus the $5.00 listing fee). According to an embodiment of the present invention, this amount is paid to the individual by crediting the amount to the substitute form of collection (in this example, the existing credit card account).

The result is a system that allows merchants to increase revenues for transactions involving individual sellers. The system also provides merchants and sellers with an efficient way of paying the seller. Features of embodiments of the invention will now be further described by referring to the appended figures.

System

Referring now to FIG. 1, an apparatus 100 according to embodiments of the present invention includes a controller 200 that is in communication with one or more transaction devices 110, with one or more approval systems 120, and with one or more authorization systems 130. The controller 200 may communicate with the transaction device 110, the approval system 120, and the authorization system 130 directly or via a network such as the Internet. The transaction device 110, the approval system 120, and the authorization system 130 may comprise computers, such as those based on the INTEL® Pentium® processor, that are adapted to communicate with the controller 200. Any number of buyer devices, approval systems, and authorization systems may be in communication with the controller 200. The controller 200 may be operated by, or on behalf of, an intermediary who interacts with individual sellers who operate the transaction devices 110. Any number of transaction devices 110, approval systems 120, authorization systems 130, and controllers 200 may be provided in any combination.

Communication between the transaction device 110, the approval system 120, the authorization system 130 and the controller 200 may be direct or indirect, such as over the Internet through a Web site maintained by controller 200 on a remote server, or over an on-line data network including commercial on-line service providers, bulletin board systems and the like. In yet other embodiments, the devices may communicate with controller 200 over radio-frequency (RF), cable television (TV), satellite links and the like. Further, different devices may communicate in different ways.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The controller 200 may function as a "Web server" that generates Web pages (documents on the Web that typically include an HTML file and associated graphics and script files) that may be accessed via the Web and allows communication with the controller 200 in a manner known in the art. The controller 200 may also function as a back-office system that services one or more retail point of sale terminals. Any or all of these devices may be located in the same or different location.

The transaction device 110 may be, e.g., a conventional personal computer, or a portable type of computer, such as a laptop computer, a palm-top computer, a hand-held computer, or a Personal Digital Assistant (PDA). The transaction device 110 may be a retail point of sale (POS) terminal such as, for example, the NCR 7454 manufactured by NCR Corporation or the IBM 4683 manufactured by INTERNATIONAL BUSINESS MACHINES®. The transaction device 110 may be wired or wireless telephones communicating with the controller 200 via a voice response unit. Any number of transaction devices 110 may be provided in any or all of the these forms.

The approval system 120 may be a computer or network of computers adapted to receive information regarding financial applications and to approve or disapprove (or assist in the approval or disapproval) of financial applications. For example, the approval system 120 may be a Web-based credit scoring system such as the systems offered by EQUIFAX, Inc.® Any approval system 120 may be used which allows the controller 200 to receive, or to otherwise generate, an indication of the approval or disapproval of a financial application.

The authorization system 130 may be a computer, or network of computers, adapted to receive information regarding proposed financial transactions and to approve or disapprove (or assist in the approval or disapproval) of the proposed transaction. For example, the authorization system 130 may be the VISANET authorization network offered by VISA INTERNATIONAL, INC.® The authorization system 130 may also be a system operated by, or on behalf of, a financial institution or other entity having the ability to receive a request to authorize a financial transaction from the controller 200.

The approval and authorization of transactions may also be entirely or partially performed locally at a retail establishment. For example, a credit card issuer may allow certain retail establishments to locally authorize transactions under a set "floor limit." Further, an off-line or local approval system may function to approve the establishment of certain types of financial accounts at, for example, a retail POS. Those skilled in the art will recognize that other types and combinations of approval and authorization systems may be used in support of embodiments of the present invention.

Devices

Figure 2:
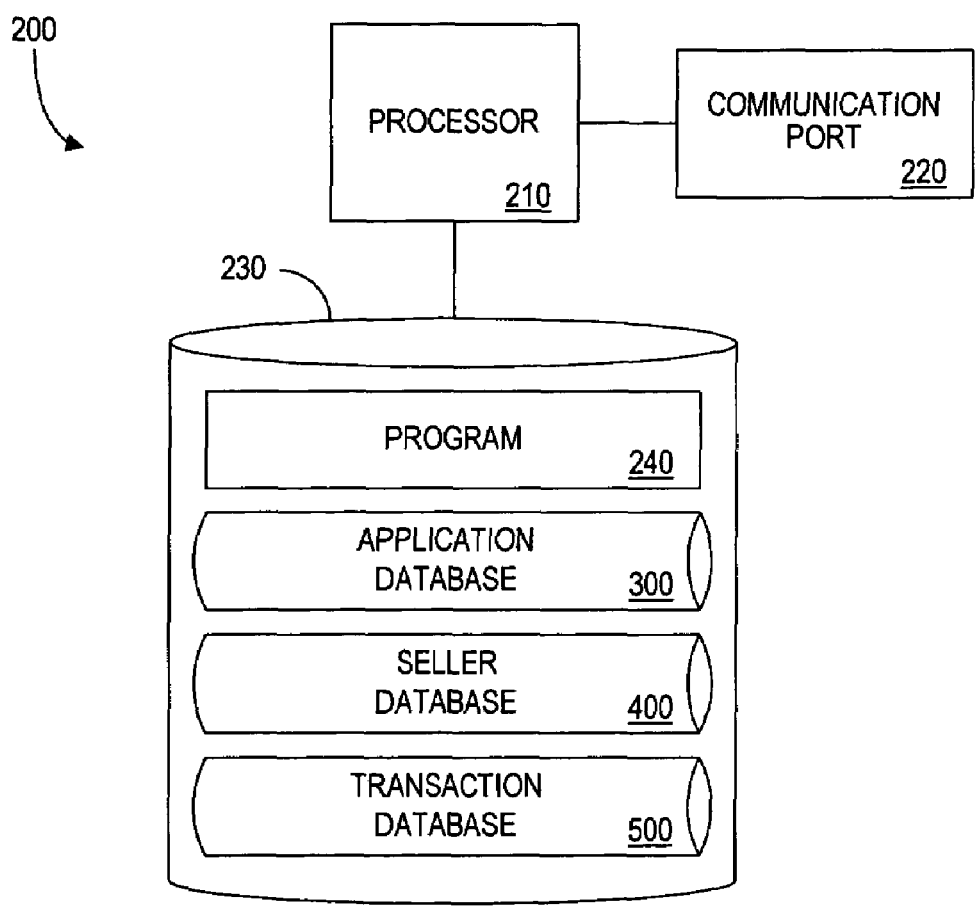
FIG. 2 is a block diagram of one embodiment of the controller depicted in FIG. 1.

FIG. 2 illustrates an embodiment of the controller 200. The controller 200 may be implemented as a system controller, a dedicated hardware circuit, an appropriately programmed general purpose computer, or any other equivalent electronic, mechanical or electro-mechanical device.

The controller 200 comprises a processor 210, such as one or more Intel® Pentium® processors. The processor 210 is coupled to a communication port 220 through which the processor communicates with other devices. The processor 210 is also in communication with a data storage device 230. The data storage device 230 comprises an appropriate combination of magnetic, optical and/or semiconductor memory, and may include, for example, Random Access Memory (RAM), Read-Only Memory (ROM), a compact disc and/or a hard disk. The processor 210 and the storage device 230 may each be, for example (i) located entirely within a single computer or other computing device or (ii) in communication to each other by a remote communication medium, such as a serial port cable, telephone line or radio frequency transceiver. In one embodiment, the controller 200 may comprise one or more computers that are in communication with a remote server computer for maintaining databases.

The data storage device 230 stores a program 240 for controlling the processor 210. The processor 210 performs instructions of the program 240, and thereby operates in accordance with the present invention, and particularly in accordance with the methods described in detail herein. The program 240 may be stored in a compressed, uncompiled and/or encrypted format. The program 240 furthermore includes program elements that may be necessary, such as an operating system, a database management system and "device drivers" for allowing the processor 210 to interface with computer peripheral devices. Appropriate program elements are known to those skilled in the art, and need not be described in detail herein.

According to an embodiment of the present invention, the instructions of the program 240 may be read into a main memory from another computer-readable medium, such as from a ROM to RAM. Execution of sequences of the instructions in program 240 causes processor 210 to perform the process steps described herein. In alternative embodiments, hard-wired circuitry may be used in place of, or in combination with, software instructions for implementation of the processes of the present invention. Thus, embodiments of the present invention are not limited to any specific combination of hardware and software.

The storage device 230 also stores (i) an application database 300 (ii) a seller database 400 and (iii) a transaction database 500. The databases 300, 400, and 500 are described in detail below and are depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information only; those skilled in the art will understand that the number and content of the entries can be different from those illustrated herein.

Databases

Application Database

Reference is now made to FIG. 3, which is a tabular representation of the application database 300. The tabular representation of the application database 300 includes a number of example records or entries, each defining a particular financial account application received by the controller 200. Those skilled in the art will understand that the application database 300 may include any number of entries. The tabular representation of application database 300 also defines fields for each of the entries or records. The fields specify, (i) an application identifier 302, (ii) a seller identifier 304, (iii) a substitute form of collection 306, (iv) an incentive amount 308, (v) an application status 310, (vi) an incentive status 312, and (vii) a new account identifier 314. Other fields may be provided as needed to further define a particular financial account application.

For each entry of the application database 300, the application identifier 302 may be established by an entity operating controller 200 or may be automatically assigned by the controller 200 as new applications are received by the controller 200. The application identifier 302 may be a unique number, code or other identifier suitable for uniquely identifying an application. The seller identifier 304 is a unique number, code, or other identifier used to uniquely identify a particular individual or entity associated with the application referred to by the application identifier 302. This seller identifier 304 may be the same as, or related to, the seller identifier discussed below in conjunction with seller database 400.

For each entry of the application database 300, the substitute form of collection 306 includes information specifying a substitute or alternative form of collection received from the customer. The substitute form of collection 306 may be, for example, a credit account, a debit account, or other financial account for which the customer has the ability to receive payment. The incentive amount 308 includes information specifying the amount of an incentive that will be paid to the seller if the financial application specified by the application identifier 302 is approved. In one embodiment, this amount will be paid to the seller via the new financial account. In other embodiments, this incentive amount 308 may be paid even if the application is rejected (e.g., the seller may receive an incentive as a reward for simply submitting an application). In some embodiments, the incentive amount 308 is paid in a single lump sum. In other embodiments, the incentive amount 308 is paid in installments.

In some embodiments, the application is for a new category or class of financial account rather than for an entirely new account. For example, the application may be for an account change from a "CLASSIC" VISA® card to a "PLATINUM" VISA® card. A lower incentive amount may be associated with such an application. According to other embodiments, several new account applications may be submitted by a seller. For example, the controller 200 may submit application information to several different credit card issuers for approval. Different issuers may provide different incentive amounts.

For each entry of the application database 300, the application status 310 includes information specifying a current status of the financial application specified by the application identifier 302. For example, the application status 310 may include information identifying whether the financial application is "PENDING", "APPROVED" or "REJECTED." Further, the application status 310 may include information specifying the approval amount.

For each entry of the application database 300, the incentive status 312 includes information specifying a current status of the incentive amount offered for the application identified by the application identifier 302. For example, the incentive status 312 may include information identifying whether or not the incentive amount 308 has been paid. In some embodiments, a seller may be able to accrue a number of incentive amounts and apply them to a later transaction.

For each entry of the application database 300, data is included in the new account identifier 314 field if the application is approved (e.g., as indicated by an application status 310 of "APPROVED"). The new account identifier 314 is an identifier of the new financial account that has been established as a result of the application identified by the application identifier 302. The new account identifier 314 may identify, for example, a new credit or debit account. If the application has been rejected (e.g., as indicated by an application status 310 of "REJECTED"), no new account identifier 314 is indicated.

Seller Database

Referring now to FIG. 4, a tabular representation of the seller database 400 is shown. The tabular representation of the seller database 400 includes a number of example records or entries, each defining or identifying a particular seller. Those skilled in the art will understand that the database 400 may include any number of entries. The tabular representation of the seller database 400 also defines fields for each of the entries or records. The fields specify (i) a seller identifier 402, (ii) a name 404, (iii) a mailing address 406, and (iv) a telephone number 408.

For each entry of the seller database 400, the seller identifier 402 may be established by an entity operating controller 200, may be automatically assigned by the controller 200, or may be based on information received by the controller 200. The seller identifier 402 may be a unique number, code or other identifier suitable for uniquely identifying an individual or entity, and may be based on, or equivalent to, information identifying an individual or entity, such as, a driver's license number, a social security number, a telephone number, an address, an account number, etc. The seller identifier 402 may be the same as, or related to, the seller identifier 304 of the application database 300 (FIG. 3).

For each entry of the seller database 400, other information identifying a seller may also be provided. The seller's name is provided as the name 404, the seller's mailing address is provided in the mailing address 406, and the seller's telephone number is provided in the phone number 408. Other fields may also be provided as needed to identify contact information for a particular customer. Those skilled in the art will recognize that the seller database 400 may include additional information as needed to allow an entity to determine whether to approve a new account for the seller. For example, a social security number or other information may be required by a credit agency to approve a new account. This information may be included as a part of seller database 400. To alleviate privacy concerns, the data in seller database 400, as well as the data in the other databases described herein, may be encrypted or otherwise secured as is known in the art.

Transaction Database

Figure 5:
FIG. 5 is a table illustrating an exemplary data structure of a transaction database for use in the present invention.

Reference is now made to FIG. 5, which is a tabular representation of the transaction database 500. The tabular representation of the transaction database 500 includes a number of example records or entries, each defining a particular transaction according to embodiments of the present invention. There may be several transaction records associated with a particular purchase. Those skilled in the art will understand that the transaction database 500 may include any number of entries. The tabular representation of the transaction database 500 also defines fields for each of the entries or records. The fields specify (i) a transaction identifier 502, (ii) a seller identifier 504, (iii) a sale price 505, (iv) a total payment 506, (v) a time 508, and (vi) a payment identifier 510.

For each entry of the transaction database 500, the transaction identifier 502 may be established by an entity operating controller 200 or may be automatically assigned by the controller 200 as transactions are conducted. The transaction identifier 502 may be a unique number, code or other identifier suitable for uniquely identifying a transaction.

The seller identifier 504 is a unique number, code, or other identifier used to uniquely identify a particular seller associated with the transaction referred to by the transaction identifier 502. This seller identifier 504 may be the same as, or related to, the seller identifier discussed above in conjunction with seller database 400. For each entry of the transaction database 500, the sale price 505 includes information identifying the sales price that is to be paid to the seller. This sales price is, e.g., the amount that a buyer has agreed to pay the seller for good or services the seller sold through the intermediary.

For each entry of the transaction database 500, the total payment 506 indicates the payment amount associated with the particular transaction identified by the transaction identifier 502, and includes the sale price 505 and any incentive amount 308 (table 300 of FIG. 3). The time 508 indicates the time and date on which the transaction identified by the transaction identifier 502 was conducted. The payment identifier 510 identifies the account used for the transaction identified by the transaction identifier 502. For example, the payment identifier 510 may identify the new financial account established for the customer or it may identify the substitute form of collection identified by the customer.

Process Description

Process Overview

Figure 6:
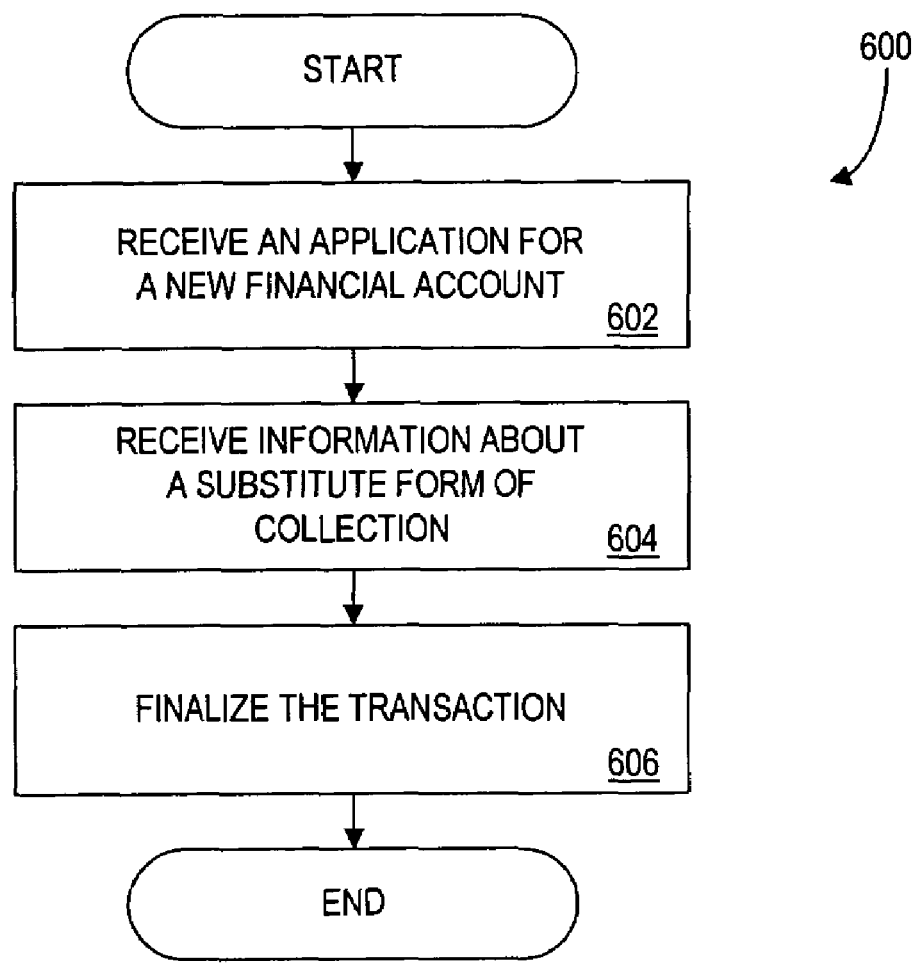
FIG. 6 is a flow diagram illustrating an exemplary process for performing a transaction according to an embodiment of the present invention.

Referring to FIG. 6, a flow chart 600 is shown which represents an overview of an embodiment of the present invention that may be performed by the controller 200 (FIG. 2). The particular arrangement of elements in the flow chart of 600 FIG. 6, as well as the other flow charts discussed herein, is not meant to imply a fixed order to the steps. Those skilled in the art will recognize that embodiments of the present invention can be practiced in any order that is practicable.

As shown in FIG. 6, a transaction begins with the receipt of an application for a new financial account (at 602). This application may be received from a seller who wishes to sell an item through an intermediary. The seller may also be a party who is selling services or information to the intermediary. The seller may have already listed a product or service for sale with the intermediary, or may be in the process of listing a product or service for sale with the intermediary. In one embodiment, the seller has previously posted a product or service for sale with the intermediary, and the controller 200 has prompted the seller to submit an application according to the present invention. In some embodiments, the controller 200 may search for sellers whose products have not yet sold and offer those sellers an incentive if they submit an application for a new financial account. In some embodiments, the intermediary may also offer an additional subsidy. For example, if a seller has listed a product for sale for $100.00, but the product has not yet sold, the intermediary may offer the seller a $10.00 incentive plus a $10.00 subsidy (allowing the product to be listed for $90.00 and increase the likelihood of the product selling) in the price of the product. Other incentives may also be offered by the intermediary.

In response to the intermediaries' incentive offer, the seller may submit an application to the controller 200 (FIG. 2) operated by, or on behalf of, the intermediary. The application may be submitted electronically at a transaction device such as a seller's computer. Alternatively, or in addition, the application may involve the submission of a paper application. The application also preferably includes some express or implied authorization to credit a payment to the new financial account if the application is approved.

At 604, a substitute form of collection is received from the seller. This substitute form of collection may be, for example, information identifying a credit or debit account held by the seller, or other information which may be used to facilitate payment of the seller. By providing the substitute form of collection, the seller also authorizes the intermediary to use the substitute form of collection as a vehicle for paying the seller. The substitute form of collection may or may not be used, depending upon the outcome of the application for the new account.

At 606, the transaction is finalized. The transaction may be finalized in several different ways. For example, if the application for a new financial account is approved, the transaction may be finalized by paying the seller a total payment amount (item 506 of FIG. 5) which includes an incentive amount 308 and a sale price of the seller's goods. This total payment amount is paid to the seller by crediting the seller's new financial account. If the application for a new financial account is rejected, the transaction may be finalized by paying the seller a total payment amount (item 506 of FIG. 5) which does not include the incentive amount 308 (i.e., the amount paid to the seller only represents the price of the product sold by the seller). This amount is paid to the seller by crediting or applying the payment to the seller's substitute form of collection. The intermediary may agree to pay the incentive amount 308 to the seller only if the new financial account is approved.

The transaction may be finalized at different times. For example, in some embodiments, the transaction is finalized as soon as an approval or rejection of an application is received (this may involve simply paying the seller the incentive amount 308). In other embodiments, the transaction is finalized after an approval or rejection of the application is received and after the intermediary sells the item to a buyer (which may be hours, days, or even weeks after the seller initially provided the application for the new account). Further, the total payment amount 506 paid to the seller may vary based on the amount received by the intermediary for the item as well as any costs or fees levied against the seller by the intermediary. Alternatively, the intermediary and seller may fix the total payment amount 506 in advance.

The result is a system which allows an intermediary to offer incentives to sellers to sell or list items for sale with the intermediary and which integrates the incentive with a payment process. Further details will be provided by referring to FIG. 7.

Figure 7:
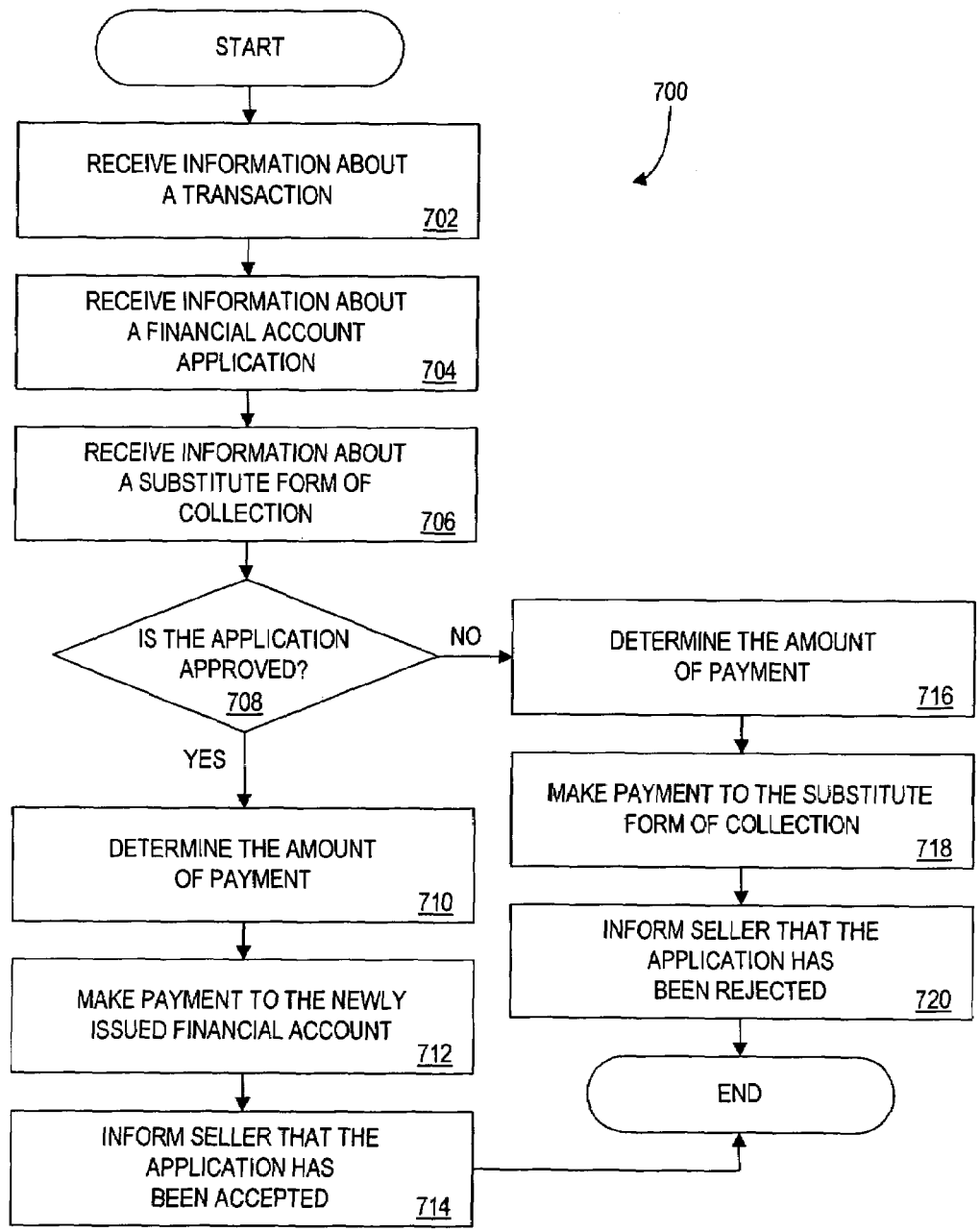
FIG. 7 is a flow diagram illustrating an exemplary process for performing a transaction according to an embodiment of the present invention.

FIG. 7 depicts a transaction process 700 according to an embodiment of the present invention. The transaction process 700 begins with the receipt of information about a transaction at 702. This may involve, for example, receiving information from a seller of a product such as information identifying the product and information identifying a sales price for the product or other information identifying the total payment amount to be paid to the seller upon sale of the product. Where the sale of services is involved, the information received at 702 may include information identifying the cost of those services or the amount to be paid to the seller. In some embodiments, the seller may receive an incentive amount from an intermediary if the seller submits an application for a new financial account. In these embodiments, different total payment amounts may be established based on whether or not the application is approved. For example, if the application is approved, the total payment amount 506 may include the sales price of the product plus the incentive amount 308, and if the application is rejected, the total payment amount 506 may simply include the sale price 505 of the product. In other embodiments, there may be no incentive amount, or the incentive amount may be paid to the seller even if the application is rejected.

At 704 information about a financial account application is received. In one embodiment, information received at 704 includes the seller information used to populate the seller database 400 (FIG. 4). This information need not be resubmitted if the seller has previously provided the seller information; instead, the seller identifier 402 may be provided. In some embodiments, the seller may be required to submit additional information needed to perform a credit check to establish the account. For example, a seller's Social Security Number and credit references may be submitted at 704. The seller may also provide written or electronic authorization permitting an intermediary to pay the seller by crediting the new financial account if the new account is approved.

Processing then continues at 706 where the seller provides information about a substitute form of collection. This may include, for example, providing information identifying a credit, debit, or other type of financial account. This information is stored as the substitute form of collection 306 in the application database 300 (FIG. 3). The information may be any information needed to specify a substitute form of collection such that a merchant can pay a seller an amount.

At 708, a determination is made whether the financial application has been approved. This determination may be based in whole, or in part, on information received from the approval system 120 (FIG. 1). If the new financial account application has been approved, processing continues at 710 where the amount of payment is determined. In some embodiments, the total amount of payment made to a seller varies based on whether or not the seller's new financial account application is approved. For example, in some embodiments, the seller receives an incentive amount 308 if the application is approved. Once the appropriate total payment amount 506 has been determined, processing continues to 712 where the system operates to make payment to the newly issued financial account. This may be done by submitting a funds transfer request, e.g., to a financial institution or by otherwise causing payment to be credited to the newly issued financial account. Processing at 712 may occur some time after the application is approved. For example, in some embodiments, the seller is paid hours, days, or even weeks after submitting the application for the new financial application. In other embodiments, payment to the seller may occur substantially contemporaneously with the receipt of the application for the new financial account. The transaction may be concluded by updating the transaction database 500 with the time 508, the total payment 506, and the payment identifier 510 reflecting the form of collection used to finalize the transaction. Other information may also be logged to reflect the fact that the transaction has concluded.

At 714, the system operates to inform the seller that the seller's application for a new financial account has been accepted. This may be performed in any of a number of different ways, for example, by telephone, electronic mail, etc.

If processing at 708 indicates that the application for the new financial account is rejected, processing continues to 716 where the total payment amount 506 is determined. In some embodiments, the seller will not receive the incentive amount 308 if the application is rejected.

Processing continues to 718 where the system operates to make payment to the substitute form of collection. This is accomplished by retrieving the information identifying the substitute form of collection 306 from the application database 300 (FIG. 3) and by causing a payment in the amount of the total payment amount 506 to be credited to the substitute form of collection. The transaction may be concluded by updating the transaction database 500 with the time 508, the total payment amount 506, and the payment identifier 510 reflecting the form of collection used to finalize the transaction. Other information may also be logged to reflect the fact that the transaction has concluded.

At 720, the system operates to inform the seller that the seller's application for a new financial account has been rejected and to inform the seller that the transaction has been finalized using the substitute form of collection. The seller may be informed in any of a number of different ways, for example, by telephone, electronic mail, etc.

Additional Embodiments

The following are several examples illustrating additional embodiments of the present invention. These examples do not constitute a definition of all possible embodiments, and those skilled in the art will understand that the present invention is applicable to many other embodiments. Further, although the following examples are briefly described for clarity, those skilled in the art will understand how to make any changes, if necessary, to the above-described apparatus and methods to accommodate these and other embodiments and applications.

In one embodiment of the present invention, the described system can be used to reimburse customers who are returning items to a retailer. In this embodiment, the retailer functions as the "intermediary" and the customer functions as the "seller" in the embodiments described above. In particular, the retailer, in accepting the returned goods, offers the customer an incentive amount if the customer applies for a new financial account and agrees to receive payment for the returned goods via the new financial account. That is, the customer may be paid a greater amount for the return if he applies (and is approved) for a new financial account than if the customer did not apply for the new financial account. This embodiment of the present invention generally follows the same process as set forth in FIGS. 6 and 7 and as discussed above.

According to another embodiment, the seller may receive payment directly from a buyer of an item or service offered by the seller. In this embodiment, the intermediary may provide the seller with an incentive for submitting an application for a new account and may credit the seller's new financial account with this incentive amount directly. The buyer may then take steps to credit the seller's new financial account with a payment amount for the item or service offered by the seller.

In another embodiment, the approval of a new financial account may be conditioned on the actual sale of an item offered by the seller. For example, a seller offering an item on an Internet auction site may specify that the new account not be established unless the item posted for sale is actually sold.

In one embodiment, the central controller receives an acceptance of the cross-subsidy offer, a completed application, and a proxy agreement that allows the merchant to make payments to the appropriate form of collection. A proxy agreement is a contract to which a payment recipient agrees that allows the system to determine the appropriate payment(s) and make these payments to the appropriate account after the financial application decision has been received.

Although the present invention has been described with respect to a preferred embodiment thereof, those skilled in the art will note that various substitutions may be made to those embodiments described herein without departing from the spirit and scope of the present invention.

What is claimed is:

1. A Web server operated by an on-line intermediary, comprising:
    a processor; and
    a memory in communication with the processor, the memory storing instructions that when executed by the processor result in:
        receiving, from a seller, information descriptive of a product that the seller desires to sell via the on-line intermediary;
        receiving, from the seller, an application to open a new financial account with a financial institution;
        receiving, from the seller, an authorization for the on-line intermediary to credit a sale price of the product and an incentive amount to the new financial account, in the case that the application for the new financial account is approved and in the case that the product is sold via the on-line intermediary;
        receiving, from the seller, information descriptive of an existing financial account owned by the seller;
        receiving, from the seller, an authorization for the on-line intermediary to credit the sale price of the product to the existing financial account, in the case that the application for the new financial account is declined and in the case that the product is sold via the on-line intermediary;
        providing information indicative of the application to open the new financial account to the financial institution;
        receiving, from the financial institution and in response to the providing of the information indicative of the application to open the new financial account, an indication descriptive of whether the application is accepted or declined; and
        crediting, upon a sale of the product to a buyer in exchange for the sale price, and in accordance with the authorizations received from the seller, an appropriate monetary amount to an appropriate one of the financial accounts.

2. The Web server of claim 1, wherein the indication descriptive of whether the application is accepted or declined comprises an indication that the application is accepted, and wherein the crediting of the appropriate monetary amount to the appropriate one of the financial accounts comprises crediting the sum of the sale price and the incentive amount to the new financial account.

3. The Web server of claim 2, wherein the incentive amount comprises a new financial account bounty received by the on-line intermediary from the financial institution, minus a fee for having the seller's product listed for sale via the on-line intermediary.

4. The Web server of claim 1, wherein the indication descriptive of whether the application is accepted or declined comprises an indication that the application is declined, and wherein the crediting of the appropriate monetary amount to the appropriate one of the financial accounts comprises crediting only the sale price to the existing financial account.

5. The Web server of claim 1, wherein the indication descriptive of whether the application is accepted or declined comprises an indication that the application is declined, and wherein the crediting of the appropriate monetary amount to the appropriate one of the financial accounts comprises crediting the sale price minus a fee for having the seller's product listed for sale via the on-line intermediary, to the existing financial account.

6. A method for operating a web server by an on-line intermediary, comprising:
    receiving, by a Web server from a seller, information descriptive of a product that the seller desires to sell via the on-line intermediary;
    receiving, by the Web server from the seller, an application to open a new financial account with a financial institution;
    receiving, by the Web server from the seller, an authorization for the on-line intermediary to credit a sale price of the product and an incentive amount to the new financial account, in the case that the application for the new financial account is approved and in the case that the product is sold via the on-line intermediary;
    receiving, by the Web server from the seller, information descriptive of an existing financial account owned by the seller;
    receiving, by the Web server from the seller, an authorization for the on-line intermediary to credit the sale price of the product to the existing financial account, in the case that the application for the new financial account is declined and in the case that the product is sold via the on-line intermediary;
    providing, by the Web server, information indicative of the application to open the new financial account to the financial institution;
    receiving, by the Web server from the financial institution and in response to the providing of the information indicative of the application to open the new financial account, an indication descriptive of whether the application is accepted or declined; and
    crediting, by the Web server upon a sale of the product to a buyer in exchange for the sale price, and in accordance with the authorizations received from the seller, an appropriate monetary amount to an appropriate one of the financial accounts.

7. The method of claim 6, wherein the indication descriptive of whether the application is accepted or declined comprises an indication that the application is accepted, and wherein the crediting of the appropriate monetary amount to the appropriate one of the financial accounts comprises crediting the sum of the sale price and the incentive amount to the new financial account.

8. The method of claim 6, wherein the incentive amount comprises a new financial account bounty received by the on-line intermediary from the financial institution, minus a fee for having the seller's product listed for sale via the on-line intermediary.

9. The method of claim 6, wherein the indication descriptive of whether the application is accepted or declined comprises an indication that the application is declined, and wherein the crediting of the appropriate monetary amount to the appropriate one of the financial accounts comprises crediting only the sale price to the existing financial account.

10. The method of claim 6, wherein the indication descriptive of whether the application is accepted or declined comprises an indication that the application is declined, and wherein the crediting of the appropriate monetary amount to the appropriate one of the financial accounts comprises crediting the sale price minus a fee for having the seller's product listed for sale via the on-line intermediary, to the existing financial account.

11. A computer readable medium storing instructions that when executed by a Web server result in:
   receiving, by a Web server from a seller, information descriptive of a product that the seller desires to sell via the on-line intermediary;
   receiving, by the Web server from the seller, an application to open a new financial account with a financial institution;
   receiving, by the Web server from the seller, an authorization for the on-line intermediary to credit a sale price of the product and an incentive amount to the new financial account, in the case that the application for the new financial account is approved and in the case that the product is sold via the on-line intermediary;
   receiving, by the Web server from the seller, information descriptive of an existing financial account owned by the seller;
   receiving, by the Web server from the seller, an authorization for the on-line intermediary to credit the sale price of the product to the existing financial account, in the case that the application for the new financial account is declined and in the case that the product is sold via the on-line intermediary;
   providing, by the Web server, information indicative of the application to open the new financial account to the financial institution;
   receiving, by the Web server from the financial institution and in response to the providing of the information indicative of the application to open the new financial account, an indication descriptive of whether the application is accepted or declined; and
   crediting, by the Web server upon a sale of the product to a buyer in exchange for the sale price, and in accordance with the authorizations received from the seller, an appropriate monetary amount to an appropriate one of the financial accounts.

12. The computer readable medium of claim 11, wherein the indication descriptive of whether the application is accepted or declined comprises an indication that the application is accepted, and wherein the crediting of the appropriate monetary amount to the appropriate one of the financial accounts comprises crediting the sum of the sale price and the incentive amount to the new financial account.

13. The computer readable medium of claim 11, wherein the incentive amount comprises a new financial account bounty received by the on-line intermediary from the financial institution, minus a fee for having the seller's product listed for sale via the on-line intermediary.

14. The computer readable medium of claim 11, wherein the indication descriptive of whether the application is accepted or declined comprises an indication that the application is declined, and wherein the crediting of the appropriate monetary amount to the appropriate one of the financial accounts comprises crediting only the sale price to the existing financial account.

15. The computer readable medium of claim 11, wherein the indication descriptive of whether the application is accepted or declined comprises an indication that the application is declined, and wherein the crediting of the appropriate monetary amount to the appropriate one of the financial accounts comprises crediting the sale price minus a fee for having the seller's product listed for sale via the on-line intermediary, to the existing financial account.

* * * * *